United States Patent [19]

Andersson et al.

[11] Patent Number: 4,876,907
[45] Date of Patent: Oct. 31, 1989

[54] MOTOR VEHICLE GEARBOX

[75] Inventors: Lars Andersson, Västra Frölunda; Sven Andersson, Floda, both of Sweden

[73] Assignee: AB Volvo, Gothenburg, Sweden

[21] Appl. No.: 156,142

[22] Filed: Feb. 16, 1988

[30] Foreign Application Priority Data

Feb. 13, 1987 [SE] Sweden .................... 8700583

[51] Int. Cl.⁴ ............................................. F16H 3/38
[52] U.S. Cl. ............................................. 74/331; 74/339; 192/4 A; 192/13 A
[58] Field of Search ........... 74/330, 331, 333, 339; 192/13 A, 4 A

[56] References Cited

U.S. PATENT DOCUMENTS

| | | | |
|---|---|---|---|
| 2,543,412 | 2/1951 | Kégresse | 74/331 X |
| 2,612,787 | 10/1952 | Youngren et al. | 74/331 X |
| 2,658,405 | 11/1953 | Dodge | 74/330 X |
| 4,463,621 | 8/1984 | Fisher | 74/330 |
| 4,738,149 | 4/1988 | Janiszewski | 74/330 |

FOREIGN PATENT DOCUMENTS

| | | | |
|---|---|---|---|
| 958081 | 1/1957 | Fed. Rep. of Germany | 74/330 |
| 87/00254 | 1/1987 | PCT Int'l Appl. | 74/331 |
| 2069635 | 8/1981 | United Kingdom . | |
| 2103316 | 2/1983 | United Kingdom . | |
| 2110324 | 6/1983 | United Kingdom . | |
| WO85/05427 | 12/1985 | World Int. Prop. O. . | |

Primary Examiner—Dwight G. Diehl
Assistant Examiner—Christopher Campbell
Attorney, Agent, or Firm—Young & Thompson

[57] ABSTRACT

The invention relates to a motor vehicle gearbox with two concentrically mounted input shafts (6,9), each driving an individual countershaft (12,15). The countershafts have gear wheels (16,18,17,19,41) in engagement with gear wheels (21,22,40) on an output shaft. The shafts are arranged in a V-configuration and one countershaft has a disengageable gear wheel (23) in engagement with a gear wheel (11) on the second countershaft to reverse the rotational direction of the latter for driving in reverse. One countershaft (12) has a central synchronizing device (30), by means of which the countershaft, which is drivingly coupled to the temporarily non-driven input shaft, can be accelerated up to a rotational speed determined by the gear speed selected.

6 Claims, 1 Drawing Sheet

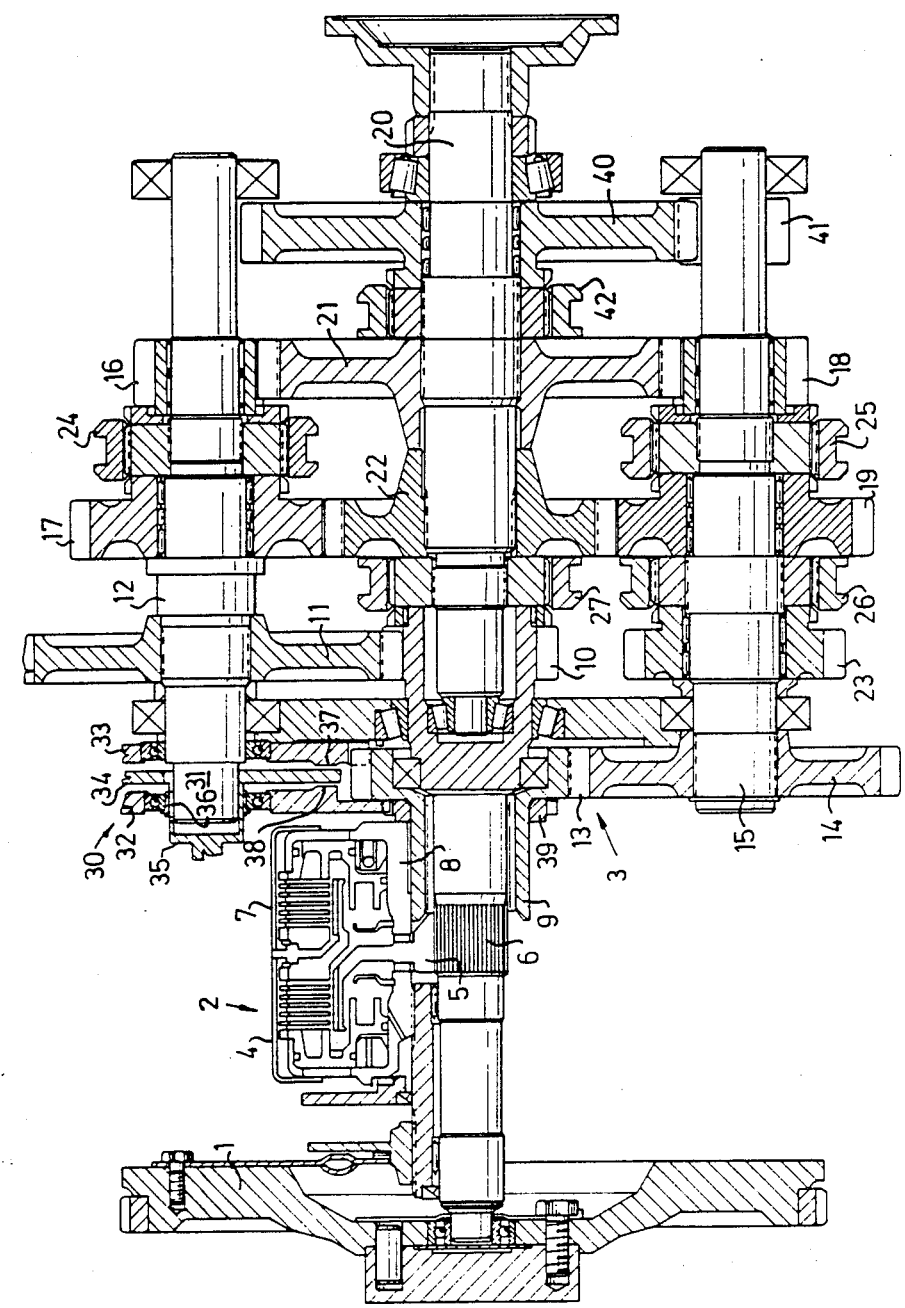

MOTOR VEHICLE GEARBOX

This present invention relates to a motor vehicle gearbox, comprising two concentrically mounted input shafts arranged to be driven alternately, and two countershafts driven by the input shafts, said countershafts having gear wheels in engagement with gear wheels on an output shaft, at least one of the gear wheels on each countershaft being rotatably mounted on its shaft and being lockable by means of engaging means to the shaft.

Double countershafts are used on one end in gearboxes in which it is desired, with a given length of the gearbox, to obtain more gear ratios than what is practically possible in a conventional gearbox design with one countershaft, and on the other hand in so-called power shift gearboxes, i.e. gearboxes with double inputs, each driven by an individual clutch. In such gearboxes, the gear speeds are preselected, and shifting is effected thereafter by disengaging one clutch and engaging the other clutch. In both of these known types of gearboxes, the driving of the countershafts is arranged so that they are always driven simultaneously, and each engaging sleeve is coordinated with its own synchronizer, i.e. the gearbox has a synchronization for each gear, which affects both the dimensions and weight of the gearbox.

In another gearbox type with double countershafts, which is known by e.g. GB A 2 110 324, a single input drives at the same time two gear wheels, which via individual clutches on the respective countershaft can be locked to the shaft and establish a gear train between the input shaft and output shaft via either countershaft. Shifting is effected according to the above mentioned power shift pattern, synchronization being achieved with the aid of a central synchronizing clutch on each countershaft at the output end of the gearbox. The synchronizing devices comprise in addition to the clutches a total of six synchronizing gears, two of which are journalled on extra shafts.

The purpose of the present invention is to provide in a gearbox of the type described by way of introduction and using the known principle of control synchronization, a basic design which permits more compact and lighter construction than what has been achieved previously and which opens the way to completely new variants each of which having advantages over the previously known designs and contributed together in particular to a very compact design of gearboxes with a large number of gear speeds.

This is achieved according to the invention by virtue of the fact that the countershafts are coordinated with synchronizing means independent of said engaging means, by means of which synchronizing means the countershaft which is drivingly coupled to the temporarily non-driven input shaft, can be accelerated up to a rotational speed determined by the gear speed selected.

Such a two-position central synchronization can be achieved with the aid of merely two synchronizing gears and with a synchronizing clutch on only one countershaft. The central synchronization has six synchronizing functions in a six-speed gearbox, which means reduced weight and smaller dimensions. The design according to the invention results in particular in very short shafts, which is advantageous with regard to torque transmission capacity and gear- and bearing-life.

If the output shaft is placed in a plane spaced from the plane of the countershafts, i.e. the shafts are placed in a V-shape, the countershafts can be provided with a pair of gear wheels in engagement with each other, at least one of which is freely rotatably mounted on its shaft and is lookable by means of clutch means to the shaft to reverse the rotational direction of the second countershaft. In this way one countershaft is used for the reversing function as well, and it is possible thereby without an extra countershaft for reverse gear in a six-speed gearbox for example to obtain five speeds in reverse.

Further features and advantages of the invention will be evident from the following description with reference to an example shown in the accompanying drawing, in which the FIGURE shows a longitudinal section through a six-speed gearbox.

In the FIGURE, 1 designates an engine flywheel, which via a multiple disc wet clutch (generally designated 2) drives a gearbox 3 according to the invention. The clutch 2 is a double clutch of a type known per se and therefore need not be described more in detail here. The clutch unit 4 to the left in the FIGURE is coupled via a sleeve element 5 to a first input shaft 6 in the gearbox, while the right-hand clutch unit 7 is coupled via a sleeve element 8 to a second input shaft 9 in the form of a hollow shaft concentrically mounted on the first shaft 6. The two clutch units can in a known manner be alternately engaged or disengaged in order to alternately drive the input shaft 6 and 9. The multiple disc wet clutch shown can be replaced by a double clutch of dry disc-type.

The first input shaft 6 is provided with a gear ring 10 in engagement with a gear wheel 11 which is solidly fixed to a first countershaft 12. The second input shaft 9 is provided with a gear ring 13 in engagement with a gear wheel 14 which is solidly fixed to a second countershaft 15. The gear ring 13 is larger than the ring 10, which means that the second countershaft 15 will rotate more rapidly than the first when the input shafts rotate at the same rotational speed.

Countershafts 12 and 15 carry individual pairs of freely rotatably mounted gear wheels 16,17 and 18,19 respectively. Gear wheel 16,18 are both in engagement with a gear wheel 21 solidly fixed to an output shaft 20. Gear wheels 17,19 are in engagement with a gear wheel 22 fixed to the output shaft. The shafts are arranged in V-shape to make it possible with an extra gear wheel 23 on countershaft 15, which gear wheel engages the gear wheel 11 on countershaft 12, to reverse the rotational direction of either countershaft for backing the vehicle. It is also possible to reverse the rotational direction of either countershaft by means of a gear wheel mounted on a separate shaft in the housing, said gear wheel engaging the gear rings 10 and 23. This provides a freer selection of V-shapes and gear ratios and also enables the shafts to be placed in the same plane. The gear wheels 16,17,18,19 and 23 are lockable to their shafts with the aid of axially displaceable engaging sleeves 24,25 and 26. A gear wheel 40 freely rotatable on the output shaft 20 engages gear teeth 41 directly cut into the countershaft 15 and it is lockable to the shaft 20 by means of an engaging sleeve 42. By cutting the gear teeth 41 directly into the countershaft 15 and arranging the gear wheel 40 lockable to the output shaft, the need is eliminated for needle bearings on the countershaft gear wheel, so that it can be made with a very small diameter, which in turn makes a large gear ratio possible from the countershaft to the output shaft. With the aid of an engaging sleeve 27, the input shaft 6 and the output shaft 20 can be locked together for direct drive.

All of these engaging means lack individual conventional synchronizing devices.

Instead, according to the invention the first countershaft 12 is coordinated with a central synchronizing device generally designated 30. This comprises a pair of gear wheels 32,33 freely rotatably mounted on an extension 31 of the countershaft 12, and an intermediate clutch disc 34 which is joined to a sleeve 35 provided with axial grooves. Axial splines 36 on the shaft portion 31 engage in the grooves in the sleeve 35 so that the sleeve and the disc 34 are axially displaceable but non-rotatable relative to the shaft 12. The sleeve 35 is connected to shift-controlling operating means (not shown in more detail here), e.g. a pneumatical hydraulic operating cylinder. The synchronizing gear wheels 32,33 are provided on their sides facing the disc 34 with frictional surfaces 37,38. The left-hand gear wheel 32 engages a gear ring 39 on the second input shaft 9. The gear ring 39 can have the same number of teeth as the gear ring 10 on the first input shaft, but in order to prevent blocking when shifting, the gear rings 10 and 39 are preferably made with teeth differing in number by one or two, for example. The right-hand synchronizing gear wheel 33 engages the gear ring 13 on the second input shaft and here there is preferably a difference of one or two teeth between the synchronizing gear wheel 33 and the driven gear wheel 14 on the second countershaft.

In the FIGURE, the gearbox is shown in a neutral position with both clutch units 4 and 7 disengaged. The first gear speed can be engaged by sliding the engaging sleeve 42 to the right, whereupon the gear wheel 40 is locked to the output shaft 20. Thereafter clutch unit 7 is engaged while clutch unit 4 remains disengaged. When driving in the first gear speed, the countershaft 12 remains stationary or substantially stationary. When the second gear speed is to be engaged, which is done by locking the gear wheel 16 to the countershaft 12 with the aid of engaging sleeve 24, the shaft 12 must be accelerated up to a rotational speed which is lower than that of the shaft 15. This is done by synchronizing the clutch disc 34 of the synchronizing device 30 to the left against the gear wheel 32, which is thus locked to the shaft 12.

After the process described, which can be called presynchronization and which involves preselection of the second gear speed while driving in the first gear speed, the actual shifting is effected by disengaging clutch unit 7 and engaging clutch unit 4. Presynchronization accounts for approximately half of the synchronization work and since it occurs during normal driving it can be done relatively slowly which is an advantage when dimensioning the components.

When preselecting the third gear speed, which is done by locking the gear wheel 18 to countershaft 15, the shaft 15 must be accelerated almost to the same rotational speed as shaft 12, since the gear wheel 18 rotates at the same speed as gear wheel 16. This is done by displacing the clutch disc 34 to the right against the gear wheel 33, which is then locked to the shaft 12 and drives the shaft 15 via the gear ring 13 and the gear wheel 14. By seeing to it as in the case above that the shaft 15 and the gear wheel 18 have approximately the same speed, the engaging sleeve 25 can be displaced into engagement with the gear wheel 18 without a risk that engaging teeth will come into such a position that shifting is blocked.

When preselecting the fourth gear speed, the countershaft 12 is accelerated to essentially the rotational speed of the gear wheel 17, i.e. a rotational speed which is lower than that of the countershaft 15. This is done by the synchronizing-disc 34 being moved to the left in the FIGURE for engaging the synchronizing gear wheel 32, whereafter the actual shifting is effected by disengaging clutch unit 7 and engaging clutch unit 4. Continued shifting up to the fifth and sixth gear speed is done in a corresponding manner by alternatingly locking the synchronizing gear wheels 32,33 to countershaft 12.

For driving and reverse the gear wheel 23 is locked with the aid of engaging sleeve 26. Depending on which of the clutches 4,7 is engaged, the rotational direction of either countershaft 12 or countershaft 15 can be reversed, and a total of five reverse gears are obtained by locking one of gear wheels 16,17,19,18,40. By direct coupling by means of engaging sleeve 27, a sixth reverse gear can be obtained.

Instead of the mechanical central synchronization described here, it is possible within the scope of the invention to have an electronic variation, e.g. one in which the intermediate shafts are coupled to individual electric motors which are controlled by a microcomputer, which selects the correct rotational speed for each countershaft for gear speed preselection. Such a variant provides greater freedom in selecting the increments between the gear speeds but on the other hand is somewhat more complicated and less reliable. Furthermore, it is possible to use the free clutch and give it a short engagement to provide the free countershaft with a suitable speed. The invention can of course also be used in gearboxes with more or fewer gear speeds than that described above.

We claim:

1. A motor vehicle gearbox, comprising first and second concentrically mounted input shafts, said input shafts arranged to be driven alternately such that one said input shaft comprises a temporarily non-driven input shaft, an output shaft, and first and second countershafts driven by said first and second input shafts, respectively, said countershafts having gear wheels in engagement with gear wheels on said output shaft, at least one of the gear wheels on each countershaft being rotatably mounted thereon and being lockable by means of engaging means to said countershaft, and each input shaft being in driving engagement with a corresponding countershaft, said first and second countershafts being coordinated with synchronizing means shiftable independently of said engaging means, by means of which synchronizing means each countershaft, which is drivingly coupled to said respective temporarily non-driven input shaft, can be accelerated up to a rotational speed determined by a gear speed selected.

2. The motor vehicle gearbox of claim 1, wherein said synchronizing means is arranged to adapt the rotational speed of one of said countershaft to approximately that of the gear wheel to be engaged.

3. The motor vehicle gearbox of claim 2, wherein said synchronizing means comprises a pair of gear wheels rotatably mounted on one of said countershafts, and friction means by which one of said gear wheels can be drivingly connected to said one countershaft, said gear wheels being in driving engagement with gear rings on said corresponding input shaft.

4. The motor vehicle gearbox of claim 3, wherein said gear wheels serving as synchronizing means include opposing frictional surfaces and an intermediate friction plate axially displaceable but non-rotatably joined to said one countershaft and connected to shifting control means.

5. The motor vehicle gearbox of claim 1, wherein said output shaft includes gear wheels which engage with gear wheels of equal dimension on said first and second countershafts.

6. The motor vehicle gearbox of claim 1, wherein said output shaft lies in a plane spaced from a plane of the said first and second countershafts, and said countershafts including a pair of gear wheels drivingly connected to each other, of which gear wheels at least one is freely rotatably mounted on said second countershaft and is lockable by means of engaging means to said second countershaft to reverse the rotational direction of said output shaft.

* * * * *